United States Patent [19]

Fitz et al.

[11] 3,946,136

[45] Mar. 23, 1976

[54] PROCESS FOR CONNECTING SHAPED STRUCTURES CONTAINING POLYTETRAFLUOROETHYLENE

[75] Inventors: Herbert Fitz; Franz Mayer, both of Burgkirchen, Alz, Germany

[73] Assignee: Hoechst Aktiengesellschaft, Frankfurt am Main, Germany

[22] Filed: Feb. 28, 1974

[21] Appl. No.: 446,964

[30] Foreign Application Priority Data

Mar. 6, 1973 Germany............................ 2311096

[52] U.S. Cl. ................ 428/422; 156/283; 156/309; 156/333; 428/421; 260/87.5 A; 260/42.27
[51] Int. Cl.² B32B 27/32; B32B 27/30; B32B 15/08
[58] Field of Search................ 161/189; 260/87.5 A; 156/309, 333, 283; 428/421, 422

[56] References Cited
UNITED STATES PATENTS

| | | | |
|---|---|---|---|
| 2,833,686 | 5/1958 | Sandt.............................. | 161/189 X |
| 3,132,123 | 5/1964 | Harris et al..................... | 260/87.5 A |
| 3,142,665 | 7/1964 | Cardinal et al................... | 260/92.1 |
| 3,304,221 | 2/1967 | Eggleton........................ | 156/333 X |
| 3,356,551 | 12/1967 | Glenn et al...................... | 156/333 X |
| 3,635,926 | 1/1972 | Gresham et al................ | 260/87.5 A |
| 3,673,054 | 6/1972 | Wright et al....................... | 161/189 |
| 3,770,711 | 11/1973 | Hartig et al.................... | 260/87.5 A |
| 3,790,403 | 2/1974 | Ribbans.............................. | 428/422 |
| 3,819,594 | 6/1974 | Holmes et al.................. | 260/87.5 A |

FOREIGN PATENTS OR APPLICATIONS

| | | |
|---|---|---|
| 952,997 | 11/1956 | Germany |
| 1,116,210 | 6/1968 | United Kingdom............ 260/87.5 A |

*Primary Examiner*—George F. Lesmes
*Assistant Examiner*—Charles E. Lipsey
*Attorney, Agent, or Firm*—Connolly and Hutz

[57] ABSTRACT

Shaped structures containing polytetrafluoroethylene are connected with themselves or with another material stable up to 400°C under elevated pressure and temperature using as interlayer between the surfaces to be connected at least one copolymer of tetrafluoroethylene and perfluoroalkyl-perfluorovinyl units in a determined proportion. The composites obtained have a high mechanic strength and the joint has good temperature endurance properties.

6 Claims, No Drawings

PROCESS FOR CONNECTING SHAPED STRUCTURES CONTAINING POLYTETRAFLUOROETHYLENE

The present invention relates to a process for connecting shaped structures containing polytetrafluoroethylene.

Owing to its outstanding properties such as high thermal and chemical resistance, excellent insulating capacity, very good dielectric values, and small coefficient of friction, polytetrafluoroethylene (PTFE) is used to an increasing extent in chemical engineering, for bearings and armatures and in electrical engineering.

In many of these applications it is necessary to connect shaped articles of PTFE with PTFE or other materials which is rather difficult due to the strong anti-adhesive behavior and the high melt viscosity of PTFE. The low surface tension of PFTE is the reason why an adhesive does not stick to the material so that a bonding of untreated PTFE is not possible. Thermal welding of PTFE by the methods generally used for plastic materials is not possible either owing to its high melt viscosity.

Several processes have been described to increase the surface tension of PTFE by chemical reactions whereby the bonding properties are improved. The preparation of such "activated" PTFE surfaces, either by a treatment with an-hydrous solutions of alkali metals, with electric discharges, or with activated noble gas ions, requires great expenditure. Moreover, the PTFE surface which has been chemically modified in this manner is gradually deactivated again under the action of electromagnetic waves inclusive of the wave length of infrared light, resulting in a constant deterioration of the bonding properties and in part also of the bonds. Furthermore, the thermal and chemical resistance of the known adhesives is, in most cases, very poor as compared to that of PTFE, so that after bonding part of the positive properties of the polymer can no longer be utilized.

Another method used to join plastics parts is the so-called welding. In this process an intimate contact of parts heated above their melting point or softening point is brought about by compressing which results in a firm connection after cooling. As measurement of the mechanic strength of such a joint, relative to the mechanic strength of the connected shaped structures the so-called welding factor is generally indicated, i.e., the quotient of the tensile strength of the joint and the tensile strength of the shaped parts to be joined. The maximum measurable welding factor is equal to 1, that is to say in a tensile test the sample is not torn at the joint.

Because of the very high melt viscosity of PTFE high pressures and long periods of time are required at the temperatures still possible for welding in order to achieve the intimate contact and to obtain a satisfactory bond. Therefore, many attempts have been made to use interlayers of an auxiliary material for the manufacture of joints of PTFE with itself or with other materials.

It has been proposed, for example, to use dispersions of unsintered PTFE, of perfluorinated hydrocarbons, of telomers of trifluorochloroethylene and of mixtures of pulverulent PTFE with the two latter classes of compounds as interlayers to connect PTFE with itself or other materials under the action of pressure and high temperatures. Owing to their high costs, the required technical expenditure and the relatively low strength of the joints obtained, all these processes are, however, seldom used.

A certain improvement has been achieved by using copolymers of tetrafluoroethylene with hexafluoropropylene as welding auxiliary as described in German Pat. No. 952,997. The quality of the joints thus obtained is, however, not satisfactory as regards their resistance to mechanical stress. The welding factor, the shearing strength under tension and especially the resistance to peeling are unsatisfactory. A poor peeling resistance means that a joint which has been slightly damaged and is subjected at this area to an unavoidable peeling stress is torn open so that after a short period of time the total joint is disconnected. It is therefore the object of the present invention to improve the quality of joints of the aforesaid type.

The present invention provides a process for connecting shaped structures containing polytetrafluoroethylene either with one another or with any other material which stable at a temperature of up to 400°C, which comprises placing between the surfaces of the shaped structures to be connected an interlayer of at least one copolymer consisting of 90 to 99.5 % by weight of tetrafluoroethylene and 0.5 to 10 % by weight of a perfluoro-alkyl-perfuorovinyl ether of the formula

$$CF_2 = CF - OR$$

in which R stands for a perfluoroalkyl chain having from 1 to 10 carbon atoms, and compressing the composite shaped structure under a pressure of from 0.1 to 20 kg/cm² at a temperature of from 320° to 400°C.

The present invention also provides composite structures consisting of shaped structures containing polytetrafluoroethylene connected with themselves or with another material which is stable up to a temperature of 400°C and having an interlayer between the surfaces to be connected of at least one copolymer of 90 to 99.5 % of tetrafluoroethylene and 0.5 to 10 % by weight of a perfluoroalkyl-perfluorovinyl ether of the aforesaid formula, said composite structures being compressed at 320° to 400° under a pressure of 0.1 to 20 kg/cm².

The copolymers to be used according to the invention consist of from 90 to 99.5 % by weight, preferably 95 to 99 % by weight of tetrafluoroethylene and 0.5 to 10 % by weight, preferably 1 to 5 % by weight of a perfluoroalkyl-perfluorovinyl ether of the formula $CF_2=CF—OR$ wherein R stands for a perfluoroalkyl chain having from 1 to 10 carbon atoms, preferably 1 to 5 carbon atoms and more preferably 1 to 3 carbon atoms. Such copolymers of tetrafluoroethylene and perfluoroalkyl-perfluorovinyl ethers, which can be prepared, for example, by the process disclosed in U.S. Pat. No. 3,132,123, shall have a melt viscosity of from 0.5 to 500 × 10⁴ poises, preferably 1 to 100 × 10⁴ poises at 380°C. The interlayers can be applied to the structures to be connected in any desired manner, preferably in the form of a sheet, granules, or powder, or as a dispersion which is subsequently dried.

To obtain a permanently stable bond the surfaces or areas to be connected must be subjected during welding to a pressure in the range of from 0.1 to 20 kg/cm², preferably 0.5 to 10 kg/cm², depending on the material or surface properties of the structures to be connected and the type of the interlayer. The time of action of the pressure is in the range of from 1 to 60 minutes, preferably 10 to 30 minutes, depending on its height, the viscosity of the interlayer and the temperature used. The pressure is applied at a temperature of from 320° to 400°C, preferably 360° to 390°C.

The process of the invention permits to bond plane surfaces of structures of pure PTFE of different geometrical shape, for example plates, bars, squares, sheets, and the like. Especially good results are obtained by connecting shaped structures and sheets of mixtures, known as PTFE compounds, of PTFE with fillers, for example glass fibers, glass spheres, pulverulent ceramic material, coal, carbon black, graphite, asbestos, mica, talcum, steel, copper, brass, bronze, lead, molybdenum disulfide, lead dioxide, cadmium oxide, titanium dioxide, aluminum oxide, or boron nitride with structures of the same material or another filled PTFE material or of pure PTFE without filler. Shaped structures of the aforesaid materials may also be satisfactorily connected with many other metallic and non metallic materials such as steel, iron, copper, aluminum, bronze, zinc, brass, glass, or ceramic products.

To carry out the process of the invention many of the welding methods known in plastics industries can be used in accordance with the nature and the shape of the structures to be connected and the desired bond. The following methods proved to be especially favorable: to produce a linear overlapping joint of sheets of PTFE or PTFE compounds with one another or with sheets of another high temperature resistant material simple known welding apparatus for plastic material is used consisting of two horizontal plates connected by a hinge which can be heated up to 400°C and the upper one of which can be loaded with weights. The area where the sheets overlap is provided with an interlayer of one of the aforesaid copolymers, the whole is placed between the two plates heated to the required temperature and by putting on the upper plate a weight corresponding to the desired pressure the sheets are compressed for a certain time.

A flat composite structure of sheets of PTFE or PTFE compounds with each other, or with sheets of another high temperature resistant organic material, or with flat structures of metallic or non metallic nature as defined above can be obtained by compressing or rolling the composite structure with the inter-layer laid between the surfaces to be bonded under the conditions of pressure, temperature and time as indicated above.

Structures of complicate shape can be joined, after having inserted a layer of at least one of the specified copolymers, by compression under the action of a clamp for 1 to 60 minutes at the desired temperature.

The process of the invention is preferably carried out with sintered structures of PTFE and PTFE compounds. It is also possible, however, to weld unsintered structures produced by compression or rolling. When a PTFE containing material is to be welded with another material in a closed mold unsintered powder may be used and the compression sintering step may be combined with the welding process.

As compared with composite structures obtained by known processes, the structures according to the present invention are characterized by a number of important advantages. They have a high strength as results from the values of the tensile shearing strength obtained, which are generally in the range of from 40 to 130 kg/cm², and above all they are extremely resistant to peeling having values not reached so far.

This resistance to peeling is particularly important with the wide spread use of bearings made of PTFE and preferably PTFE compound material. In constructions of this type the sliding surface of PTFE or PTFE compound is fastened by welding on a metal support where it is subject to a high peeling stress. The composite structures in accordance with the invention generally have a resistance to peeling of from 4 to 10 kg/cm.

Furthermore, the composite structures are stable at very high temperatures, they have thermal endurance properties of up to 260°C, and are resistant to practically all chemicals.

The copolymers of tetrafluoroethylene and perfluoroalkyl-perfluorovinyl ethers are excellent thermoplastic adhesives and can also be used firmly to join other materials, for example metals with metals, non metals with non metals and metals with non metals. Joints of steel with steel and aluminum with aluminum were found to have an extremely good tensile shearing strength.

The following examples illustrate the invention. The indicated values are mean values of three measurements.

EXAMPLE 1

Sheet materials of different thickness of PTFE and PTFE compounds were welded to the same or an other type of material using a simple welding apparatus consisting of two horizontal welding dies having a breadth of 5 mm, connected by a hinge, and heatable to 400°C. On the area of overlapping an interlayer of a sheet 500 or 100 microns thick of a copolymer of 97.5 % by weight of tetrafluoroethylene and 2.5 % by weight of perfluoro-propyl-perfluorovinyl ether having a melt viscosity of $2.5 \times 10^4$ poises at 380°C was placed, the whole was inserted between the dies heated to 380° – 400°C and for a determined period of time the upper die was loaded with the desired welding pressure.

In the following table I are compared the welding factors of the welds obtained with the copolymer of the invention with those of a weld obtained with a copolymer of 78 % by weight of tetra-fluoroethylene (TFE) and 22 % by weight of hexafluoropropylene (HFP).

The welding factors were determined as follows: Six test strips according to ASTM D-1457 were cut out of the composite sheet in such a way that three of them had the weld in the center in transverse direction with respect to the longitudinal axis of the strips, while the other three strips did not have a weld. The test strips were cut so as to have the preferred orientation of the sheet in the direction of the longitudinal axis. All test strips were tested on a tensile tester with an advance of 50 mm/min. The welding factor is the quotient of the mean value of the forces required for tearing the strips having a weld and the mean value of the forces necessary for tearing the strips without weld.

TABLE I

| Composite thickness of sheets | μm | PTFE/PTFE 500 | | | | PTFE/PTFE 500 | | | | PTFE/PTFE 200 | | | | PTFE compound/ PTFE compound/ +25% coal/+25% coal 500 | | | |
|---|---|---|---|---|---|---|---|---|---|---|---|---|---|---|---|---|---|
| thickness of interlayer | μm | 500 | | | | 100 | | | | 100 | | | | 500 | | | |
| welding pressure | kg/cm² | 0.5 | | 2.2 | | 0.5 | | 2.2 | | 0.5 | | 2.2 | | 0.5 | | 2.2 | |
| welding period | min. | 10 | 20 | 10 | 20 | 10 | 20 | 10 | 20 | 10 | 20 | 10 | 20 | 10 | 20 | 10 | 20 |
| welding factor with TFE/HFP interlayer | | 0.50 | 0.50 | 0.50 | 0.50 | 0.46 | 0.50 | 0.46 | 0.48 | 0.65 | 0.68 | 0.68 | 0.70 | 0.91 | 0.93 | 0.95 | 0.98 |
| welding factor with TFE/ $CF_2=CFOC_3F_7$ interlayer | | 0.62 | 0.69 | 0.63 | 0.63 | 0.64 | 0.66 | 0.70 | 0.63 | 0.87 | 0.85 | 0.89 | 1.0 | 1.0 | 1.0 | 1.0 | |

| Composite thickness of sheets | μm | PTFE comp./PTFE comp. +15% glass fibers +15% glass fibers 500 | | | | PTFE comp./PTFE comp. +60% bronze +60% bronze 500 | | | | PTFE/PTFE compound +25% coal 200 | | | |
|---|---|---|---|---|---|---|---|---|---|---|---|---|---|
| thickness of interlayer | μm | 500 | | | | 500 | | | | 500 | | | |
| welding pressure | kg/cm² | 0.5 | | 2.2 | | 0.5 | | 2.2 | | 0.5 | | 2.2 | |
| welding period | min. | 10 | 20 | 10 | 20 | 10 | 20 | 10 | 20 | 10 | 20 | 10 | 20 |
| welding factor with TFE/HFP interlayer | | 0.74 | 0.79 | 0.80 | 0.64 | 0.82 | 0.88 | 0.90 | 0.72 | 0.58 | 0.61 | 0.65 | 0.65 |
| welding factor with TFE/ $CF_2=CFOC_3F_7$ interlayer | | 0.89 | 0.92 | 1.0 | 0.95 | 0.95 | 0.98 | 1.0 | 0.90 | 0.69 | 0.70 | 0.72 | 0.72 |

EXAMPLE 2

Sheets were welded as described in Example 1 using as interlayer a sheet of a copolymer of 97.2 % by weight of tetrafluoroethylene and 2.8 % by weight of perfluoroethyl-perfluorovinyl ether having a melt viscosity of $2.2 \times 10^5$ poises at 380°C. The particulars are listed in the following Table II.

TABLE II

| composite sheet thickness | μm | PTFE/PTFE 200 | | PTFE comp./PTFE comp. 20% coal /25% coal 500 | | PTFE comp./PTFE comp. 25% coal 500 | |
|---|---|---|---|---|---|---|---|
| | | 200 | 200 | 500 | 500 | 500 | 500 |
| thickness of interlayer | μm | 100 | | 500 | | 500 | |
| welding pressure | kg/cm² | 0.5 | 2.2 | 0.5 | 2.2 | 0.5 | 2.2 |
| welding period | min. | 10 | 10 | 20 | 20 | 20 | 20 |
| welding factor | | 0.89 | 0.89 | 1.0 | 1.0 | 0.69 | 0.69 |

EXAMPLE 3

Sheets were welded under the conditions specified in Example 1 using as interlayer a sheet of a copolymer of 97.9 % by weight of tetrafluoroethylene and 2.1 % by weight of perfluoromethyl-perfluorovinyl ether having a melt viscosity of $2.4 \times 10^5$ poises at 380°C. The particulars are listed in the following Table III.

TABLE III

| composite | | PTFE/PTFE | | PTFE comp./PTFE comp. 25% coal 25% coal | | PTFE comp./PTFE 25% coal | |
|---|---|---|---|---|---|---|---|
| thickness of sheets | μm | 200 | 200 | 500 | 500 | 500 | 500 |
| thickness of interlayer | μm | 100 | | 500 | | 500 | |
| welding pressure | kg/cm² | 0.5 | 2.2 | 0.5 | 2.2 | 0.5 | 2.2 |
| welding period | min. | 10 | 10 | 20 | 20 | 20 | 20 |
| welding factor | | 0.78 | 0.79 | 1.0 | 1.0 | 0.71 | 0.71 |

EXAMPLE 4

Two small plates having the dimensions 30 × 20 × 4 mm were placed one above the other so as to overlap at the small sides for 5 mm with insertion of a 500 micron thick sheet of a copolymer of tetrafluoroethylene with a perfluoroalkyl-perfluorovinyl ether of the formula $CF_2 = CF - OR$ (2.1 % by weight with $R = CF_3$, 2.8 % by weight with $R = C_2F_5$, 2.5 % by weight with $R = C_3F_7$), the lap was clamped in screw clamp and kept for 30 minutes at 380°C. After cooling the screw clamp was opened and the strength of the bond was tested in a tensile tester in the direction of the longitudinal axis of the bonded plates with an advance of 50 mm/min. The results of the tensile shearing tests obtained with a plurality of composites and different copolymer interlayers are listed in Table IV. For comparison the results obtained with a sheet of tetrafluoroethylene/hexafluoropropylene copolymer (78 % by weight TFE/22 % by weight HFP) as interlayer are also indicated.

TABLE IV

Tensile shearing strength (kg/cm²) with a 500 micron thick sheet as interlayer of a copolymer of tetrafluoroethylene with a compound $CF_2 = CF - OR$ composite wherein R represents

| | $CF_3$ | $C_2F_5$ | $C_3F_7$ | with HFP |
|---|---|---|---|---|
| PTFE/PTFE | 75 | 85 | 84 | 68 |
| PTFE/steel | 80 | 89 | 91 | 71 |
| PTFE/aluminum | 55 | 68 | 60 | 51 |
| PTFE/PTFE comp. + 15% glass fibers | 79 | 89 | 82 | 48 |
| PTFE/PTFE comp. + 25% coal | | 100 | 82 | |
| PTFE comp./steel + 60% bronze | | | 105 | 71 |
| PTFE comp./steel + 15% glass fibers | 78 | 88 | 83 | 74 |
| PTFE comp./steel + 25% coal | | | 107 | 80 |
| PTFE comp./steel + 60% bronze | | | 107 | 72 |
| PTFE comp./PTFE comp. 15% glass + 15% glass fibers | 68 | 76 | 76 | 48 |
| PTFE comp./PTFE comp. + 25% coal + 25% coal | | | 105 | 60 |
| PTFE comp./PTFE comp. + 60% bronze + 60% bronze | | | 92 | 53 |

EXAMPLE 5

Two 500 micron thick sheets 200 × 50 mm in size were placed one upon the other with insertion of a sheet of 180 × 50 mm and 100 microns thick made of a tetrafluoroethylene/perfluoropropyl-perfluorovinyl ether copolymer (97.5 : 2.5 % by weight) and the whole was compressed on a heatable press for 30 minutes at 380°C under a pressure of 2 kg/cm². The peeling strength of the composites is listed in the following Table V, in comparison to the peeling strength of composites made in analogous manner but with an interlayer of TFE/HFP copolymer (78 / 22 % by weight).

To test the peeling strength test strips of the dimensions 10 × 200 mm were cut out from the composites, the non bonded ends of the sheets were bent upward or downward by 90° and clamped in the gripping jaws of a tensile tester in which the strength of the joint was tested with an advance of 50 mm/min. The force required to disconnect the composite is the peeling resistance expressed in kg/cm.

TABLE V

| Composite | PTFE/PTFE | PTFE/steel | PTFE compound/steel + 60 % bronze |
|---|---|---|---|
| peeling resistance with interlayer of TFE/perfluoropropyl-perfluorovinyl ether | 7.5 | 4.5 | 6.0 |
| peeling resistance with interlayer of TFE/HFP | 1.5 | very low, not measurable | very low, not measurable |

EXAMPLE 6

A sheet composite was prepared as described in Example 5 using as interlayer a pulverulent tetrafluoroethylene/perfluoropropyl-perfluorovinyl ether copolymer (composition as in Example 5). The PTFE/PTFE composite had a peeling resistance of 7.0 kg/cm.

We claim:

1. A process for connecting shaped structures containing polytetrafluoroethylene with themselves or with another material stable at a temperature of up to 400°C, which comprises placing between the structures to be connected an interlayer consisting of at least one copolymer of from 90 to 99.5 % by weight of tetrafluoroethylene and 0.5 to 10 % by weight of a perfluoroalykl-perfluorovinyl ether of the formula $CF_2 = CF-OR$ in which R represents a perfluoroalkyl chain having from 1 to 10 carbon atoms and compressing the composite structure under a pressure of from 0.1 to 20 kg/cm$^2$ at a temperature of from 320° to 400°C.

2. The process of claim 1, wherein the interlayer consists of at least one copolymer of from 95 to 99 % by weight of tetra-fluoroethylene and 1 to 5 % by weight of the perfluoroalkyl-perfluorovinyl ether.

3. The process of claim 1, wherein the perfluoroalkyl-perfluorovinyl ether has an alkyl chain of 1 to 3 carbon atoms.

4. A composite structure consisting of shaped structures containing polytetrafluoroethylene connected with themselves or another material stable at a temperature of up to 400°C and an interlayer of at least one copolymer of from 90 to 99.5 % by weight of tetrafluoroethylene and 0.5 to 10 % weight of a perfluoro-alkyl-perfluorovinyl ether of the formula $CF_2 = CF-OR$ wherein R represents a perfluoroalkyl chain having from 1 to 10 carbon atoms, said composite structure being compressed at 320° to 400°C under a pressure of from 0.1 to 20 kg/cm$^2$.

5. A composite structure as claimed in claim 4 wherein the interlayer consists of at least one copolymer of from 95 to 99 % by weight of tetrafluoroethylene and 5 to 1 % by weight of a perfluoro-alkyl-perfluorovinyl ether.

6. A composite structure as claimed in claim 4, wherein the perfluoroalkyl-perfluorovinyl ether has an alkyl chain of 1 to 3 carbon atoms.

* * * * *